(12) United States Patent
Libster et al.

(10) Patent No.: US 11,135,815 B2
(45) Date of Patent: Oct. 5, 2021

(54) INTERMEDIATE TRANSFER MEMBERS

(71) Applicant: HP Indigo B.V., Amstelveen (NL)

(72) Inventors: Dima Libster, Nes Ziona (IL); Sergey Inotaev, Nes Ziona (IL); Dina Voloshin Firouz, Nes Ziona (IL); Rafael Kahatabi, Nes Ziona (IL); Dafna Shunary, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 109 days.

(21) Appl. No.: 16/474,653

(22) PCT Filed: Apr. 10, 2017

(86) PCT No.: PCT/EP2017/058543
§ 371 (c)(1),
(2) Date: Jun. 28, 2019

(87) PCT Pub. No.: WO2018/188721
PCT Pub. Date: Oct. 18, 2018

(65) Prior Publication Data
US 2019/0317432 A1  Oct. 17, 2019

(51) Int. Cl.
*B32B 27/00* (2006.01)

(52) U.S. Cl.
CPC .......... *B32B 27/00* (2013.01); *B32B 2255/26* (2013.01); *B32B 2433/00* (2013.01); *Y10T 428/24802* (2015.01)

(58) Field of Classification Search
CPC . B32B 27/00; B32B 2255/26; B32B 2433/00; Y10T 428/24802

USPC ...................................................... 428/32.81
See application file for complete search history.

(56) References Cited

U.S. PATENT DOCUMENTS

| | | | |
|---|---|---|---|
| 6,052,550 | A | 4/2000 | Thornton et al. |
| 6,551,716 | B1 | 4/2003 | Landa et al. |
| 7,128,412 | B2 | 10/2006 | King et al. |
| 8,428,495 | B2 | 4/2013 | Li |
| 8,440,379 | B2 | 5/2013 | Roditi et al. |
| 2012/0171494 | A1 | 7/2012 | Ferrar et al. |
| 2014/0204160 | A1 | 7/2014 | Cote et al. |
| 2015/0024648 | A1* | 1/2015 | Landa ............... C09J 183/04 442/286 |
| 2015/0231910 | A1* | 8/2015 | Dooley ............. B41N 10/02 347/103 |

(Continued)

FOREIGN PATENT DOCUMENTS

| | | |
|---|---|---|
| CN | 102712203 | 10/2012 |
| CN | 104136510 | 11/2014 |
| ER | 2822780 | 1/2015 |

(Continued)

OTHER PUBLICATIONS

Calsak Corporation. KTL-500F (Year: 2013).*
International Search Report dated Dec. 13, 2017 for PCT/EP2017/058543, Applicant HP Indigo B.V.

*Primary Examiner* — Betelhem Shewareged
(74) *Attorney, Agent, or Firm* — Thorpe North & Western LLP (57) ABSTRACT

The present disclosure relates to an intermediate transfer member for use in electrophotographic printing. The intermediate transfer member comprises a release layer comprising fluoropolymer particles dispersed in a silicone polymer matrix.

20 Claims, 4 Drawing Sheets

(56) References Cited

U.S. PATENT DOCUMENTS

2017/0023899 A1\* 1/2017 Fukuda .................. G03G 15/50
2019/0317432 A1\* 10/2019 Libster .................... B32B 27/00

FOREIGN PATENT DOCUMENTS

| JP | 2000112256 | 4/2000 | | |
|---|---|---|---|---|
| JP | 2007316272 | 12/2007 | | |
| JP | 2007316272 A | \* 12/2007 | ............. | G03G 15/16 |

\* cited by examiner

INTERMEDIATE TRANSFER MEMBERS

BACKGROUND

Electrophotographic printing involves creating an image on a photoconductive surface or photo imaging plate (PIP). The image that is formed is a latent electrophotographic image having image and background areas with different potentials. When an electrophotographic ink composition containing charged toner particles is brought into contact with the selectively charged photoconductive surface, the charged toner particles adhere to the charged areas of the latent image while the background areas remain clean.

The charged toner particles may then be transferred from the photoconductive surface to a print substrate (e.g. paper) using an intermediate transfer member (ITM).

BRIEF DESCRIPTION OF THE DRAWINGS

Various features will be described, by way of example only, with reference to the following figures, in which.

DETAILED DESCRIPTION

Before the compositions, release layers, intermediate transfer members (ITMs), methods and related aspects of the disclosure are described, it is to be understood that this disclosure is not restricted to the particular process features and materials disclosed herein because such process features and materials may vary. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, a "liquid electrophotographic ink" or "LEP ink" generally refers to an ink composition, in liquid form, generally suitable for use in a liquid electrostatic printing process, also termed a liquid electrophotographic (LEP) printing process. The LEP ink may include chargeable particles of a resin and a pigment/colourant dispersed in a liquid carrier, which may be as described herein.

The LEP inks referred to herein may comprise a colourant and a thermoplastic resin dispersed in a carrier liquid. In some examples, the thermoplastic resin may comprise an ethylene acrylic acid resin, an ethylene methacrylic acid resin or combinations thereof. In some examples, the electrostatic ink also comprises a charge director and/or a charge adjuvant. In some examples, the liquid electrostatic inks described herein may be ElectroInk® and any other Liquid Electro Photographic (LEP) inks developed by Hewlett-Packard Company.

As used herein, "liquid carrier", "carrier liquid", "carrier," or "carrier vehicle" refers to a liquid in which resin, pigment, charge directors and/or other additives may be dispersed to form a liquid electrostatic ink or liquid electrophotographic ink. A variety of different agents, for example surfactants and viscosity modifiers, may also be dispersed or dissolved in the carrier liquid. The carrier liquid may comprise, for example, an insulating, non-polar, non-aqueous liquid. A mixture of two or more liquids may be employed. The carrier liquid may have a resistivity in excess of about $10^9$ ohm·cm. The carrier liquid may have a dielectric constant below about 5, in some examples below about 3. The carrier liquid may include hydrocarbons. In some examples, the carrier liquid comprises or consists of, for example, Isopar-G™, Isopar-H™, Isopar-L™, Isopar-M™, IsoparK™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION).

As used herein, "co-polymer" refers to a polymer that is polymerized from at least two monomers.

All viscosities described in this disclosure are viscosities determined at 25° C. unless stated otherwise.

Viscosities described in this disclosure may be determined according to ASTM D4283-98 (2010) Standard Test Method for Viscosity of Silicone Fluids. In some examples, viscosities described herein may be measured on a viscometer, such as a Brookfield DV-II+ Programmable viscometer, using appropriate spindles, including, but not limited to, a spindle selected from spindle LV-4 (SP 64) 200-1,000 [mPa·s] for Newtonian fluids (pure silicones) and spindle LV-3 (SP 63) 200-800,000 [mPa·s] for non-Newtonian fluids (silicone oils with carbon black).

If a standard test is mentioned in this disclosure, unless otherwise stated, the version of the test to be referred to is the most recent at the time of filing this patent application.

As used in this disclosure, "electrophotographic(ally) printing" or "electrostatic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrophotographic printing process may involve subjecting the electrophotographic composition to an electric field, e.g. an electric field having a field gradient of 1-1000V/µm, or more.

As used in this disclosure, the term "about" is used to provide flexibility to a numerical range endpoint by providing that a given value may be a little above or a little below the endpoint. The degree of flexibility of this term can be dictated by the particular variable.

As used in this disclosure, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature described herein can be combined with any aspect or any other feature described herein.

In one aspect, the present disclosure relates to an intermediate transfer member for use in electrophotographic printing. The intermediate transfer member comprises a release layer comprising fluoropolymer particles dispersed in a silicone polymer matrix.

In another aspect, the present disclosure relates to a method of making an intermediate transfer member. The method comprises applying a pre-cure release composition comprising at least one polysiloxane having crosslinkable moieties and fluoropolymer particles onto a supporting substrate, and curing the pre-cure release composition on the supporting substrate.

The present disclosure also relates to an electrophotographic printer comprising an intermediate transfer member comprising a release layer comprising fluoropolymer particles dispersed in a silicone polymer matrix.

As described above, an intermediate transfer member is used in electrophotographic printing to transfer electrophotographic ink from a photoconductive surface onto a print substrate. The intermediate transfer member may comprise a supporting substrate (e.g. a flexible substrate) comprising a release layer. When electrophotographic ink from the photoconductive surface is transferred to the intermediate transfer member and heated, the toner particles in the electrophotographic ink may fuse to form a tacky polymer film. When the tacky polymer film is placed in contact with the cooler surface of a print substrate, the polymer film may harden and adhere to the print substrate. The print substrate can then be released from the intermediate transfer member.

The release layer of the intermediate transfer member can facilitate the transfer of ink from the intermediate transfer member to the print substrate. If transfer is incomplete, ink may be left on the intermediate transfer member, compromising the release properties of the intermediate transfer member. This may cause the print substrate to adhere to the intermediate transfer member in subsequent print cycles, reducing the effectiveness of the printing process and lifespan of the intermediate transfer member.

In the present disclosure, it has been found that it is possible to produce a release layer by dispersing fluoropolymer particles into a silicone polymer matrix. By dispersing fluoropolymer particles into a silicone polymer matrix, it is possible to produce a release layer with effective release properties, while, at the same time, maintaining the mechanical properties of the intermediate transfer member. The fluoropolymer particles may also be dispersed to form a pre-cure release composition that can be applied and cured onto a flexible substrate to form a release layer in an effective manner.

Fluoropolymer

In the present disclosure, the intermediate transfer member comprises a release layer comprising fluoropolymer particles dispersed in a silicone polymer matrix. Any suitable fluoropolymer may be employed. In one example, the fluoropolymer may be polytetrafluoroethylene (e.g. PTFE).

The fluoropolymer (e.g. PTFE) particles may be present in the release layer in an amount of at least 0.1 wt % based on the total weight of silicone polymer in the release layer. In some examples, the fluoropolymer (e.g. PTFE) may be present in an amount of at least 0.2 wt %, for instance, at least 0.3 wt % based on the total weight of the silicone polymer in the release layer. In some examples, the fluoropolymer (e.g. PTFE) may be present in an amount of at least 0.4 wt %, for instance, at least 0.5 wt % based on the total weight of silicone polymer in the release layer. In some examples, the fluoropolymer (e.g. PTFE) may be present in an amount of at most 7 wt %, for instance, at most 5 wt % % based on the total weight of silicone polymer in the release layer. In some examples, the fluoropolymer (e.g. PTFE) may be present in an amount of at most 4 wt %, for instance, at most 3 wt % % based on the total weight of silicone polymer in the release layer. In some examples, the fluoropolymer (e.g. PTFE) may be present in an amount of 0.1 to 7 wt %, for instance, 0.2 to 5 wt % % based on the total weight of silicone polymer in the release layer. In some examples, the fluoropolymer (e.g. PTFE) may be present in an amount of 0.25 to 3 wt %, for instance, 0.5 to 2.5 wt % or 1 to 2 wt % based on the weight of silicone polymer.

The fluoropolymer (e.g. PTFE) particles may have a primary particle size of less than 5 μm, for example, less than 2 μm. In some examples, the fluoropolymer (e.g. PTFE) particles may be sub-micron particles. Particle size may be determined by Hegman ASTM D-1210. By primary particles, it is meant individual particles as opposed to clusters of particles.

In some examples, for instance, prior to being dispersed in the silicone polymer matrix, the fluoropolymer (e.g. PTFE) particles may be present in a composition in which the particles may clump together to form clusters. The clusters of particles may have an average particle size of 30 to 200 μm, for example, 60 to 150 μm. In some examples, the particle size distribution of the clusters of particles are such that 10 wt % of the particles have a particle size ($D_{10}$) of less than 50 μm, for example, less than 40 μm or 25 μm. In some examples, particle size distribution of the clusters of particles are such that 90 wt % of the particles have a particle size ($D_{90}$) of less than 200 μm, for instance, less than 150 μm.

The fluoropolymer (e.g. PTFE) particles may have a melting point of 250 to 400 degrees C., for example, 300 to 380 degrees C. In some examples, the fluoropolymer (e.g. PTFE) may have a melting point of 320 to 360 degrees C., for instance, 330 to 340 degrees C.

The fluoropolymer (e.g. PTFE) particles may have a bulk density of 300 to 800 g/l, for example, 400 to 700 g/l or 500 to 600 g/l. In some examples, the fluoropolymer (e.g. PTFE) particles may have a bulk density of 510 to 550 g/l. Bulk density may be determined by ASTM D-4894.

The fluoropolymer (e.g. PTFE) particles may have a surface area of 1.5 to 5 m$^2$/g, for example, 2 to 4 m$^2$/g. In some examples, the fluoropolymer (e.g. PTFE) may have a surface area of 3 to 3.5 m$^2$/g. Surface area may be determined by Krypton absorption.

The fluoropolymer (e.g. PTFE) particles may be soft, round sub-micron particles. Examples of suitable particles are sold under the trademark Fluon® FL1700 by AGC Chemicals Americas, Inc.

Without wishing to be bound by any theory, the fluoropolymer particles may improve the release properties of the silicone polymer matrix by increasing the hydrophobicity of the silicone polymer matrix. The fluoropolymer particles may be distributed uniformly throughout the release layer. In some examples, the concentration of fluoropolymer particles is greater at the outward-facing surface of the release layer and lower at the inward-facing surface of the release layer adjacent the supporting substrate of the intermediate transfer member.

Silicone Polymer

As described above, the intermediate transfer member comprises a release layer comprising fluoropolymer particles dispersed in a silicone polymer matrix. The silicone polymer matrix may be formed of any suitable silicone polymer. For example, the silicone polymer may be formed by crosslinking at least one polysiloxane having crosslinkable moieties.

A suitable polysiloxane having crosslinkable moieties may comprise a polysiloxane(s) having side and/or terminal alkenyl groups. In one example, the polysiloxane may have the formula:

where $R_1$ to $R_8$ are each independently selected from an alkyl group, cycloalkyl or an alkenyl group, wherein at least two of $R_1$ to $R_8$ are alkenyl groups; and t is an integer of at least 1, in some examples at least 10, in some examples at least 100.

The alkyl group(s) may be straight chain or branched. Suitable alkyl groups may be $C_{1-12}$ alkyl groups, for example, $C_{1-6}$ alkyl groups. Examples include methyl, ethyl, propyl, butyl and hexyl groups. In some examples, the alkyl group may be methyl groups.

Suitable alkenyl groups include vinyl groups. In some examples, the alkenyl groups may be terminal vinyl groups. In some examples, the polysiloxane may comprise terminal alkenyl groups and alkenyl side groups.

In some examples, the polysiloxane having crosslinkable moieties may have a dynamic viscosity of 100 mPa·s or more, in some examples 200 mPa·s or more, in some examples 300 mPa·s or more, in some examples 400 mPa·s or more.

In some examples, the polysiloxane having crosslinkable moieties may have a dynamic viscosity of 5,000 mPa·s or less, in some examples 1,000 mPa·s or less, in some examples 900 mPa·s or less, in some examples 800 mPa·s or less, in some examples 700 mPa·s or less, in some examples 600 mPa·s or less.

In some examples, the polysiloxane having crosslinkable moieties may have a dynamic viscosity of 100 to 5,000 mPa·s, in some examples 100 to 1,000 mPa·s, in some examples 200 to 1,000 mPa·s, in some examples 200 to 900 mPa·s, in some examples 300 to 800 mPa·s, in some examples 400 to 700 mPa·s, in some examples 400 to 600 mPa·s, in some examples about 500 mPa·s.

In some examples, the polysiloxane having crosslinkable moieties may comprise a vinyl-terminated dimethylsiloxane homopolymer. In some examples, the polysiloxane may comprise a dimethylsiloxane homopolymer of the α,ω(dimethyl-vinylsiloxy)poly(dimethylsiloxyl) type. In some examples, the dimethylsiloxane homopolymer may have a dynamic viscosity of at least 100 mPa·s. In some examples, the dimethylsiloxane homopolymer may have a dynamic viscosity of from 100 to 1,000 mPa·s, in some examples 200 to 900 mPa·s, in some examples 300 to 800 mPa·s, in some examples 400 to 700 mPa·s, in some examples 400 to 600 mPa·s, in some examples about 500 mPa·s.

In some example, the polysiloxane having crosslinkable moieties may comprise a co-polymer of vinylmethylsiloxane and dimethylsiloxane. In some examples, a vinyl group is covalently bonded to each of the end siloxyl units of the co-polymer. In some examples the co-polymer of vinylmethylsiloxane and dimethylsiloxane is of the poly(dimethylsiloxyl)((methylvinylsiloxy)α,ω(dimethyl-vinylsiloxy) type.

The co-polymer of vinylmethylsiloxane and dimethylsiloxane may have a dynamic viscosity of from 1,000 to 5,000 mPa·s. In some examples, the co-polymer of vinylmethylsiloxane and dimethylsiloxane may have a dynamic viscosity of from 2,000 to 4,000 mPa·s, in some examples a dynamic viscosity of from 2500 to 3,500 mPa·s, in some examples a dynamic viscosity of about 3,000 mPa·s.

In some examples, the polysiloxane having crosslinkable moieties may comprise a vinyl-terminated dialkylsiloxane homopolymer and a copolymer of a vinylalkylsiloxane and a dialkylsiloxane. In some examples, the polysiloxane may comprise a dimethylsiloxane homopolymer, and a co-polymer of vinylmethylsiloxane and dimethylsiloxane. In some examples, the co-polymer of vinylmethylsiloxane and dimethylsiloxane may also be vinyl-terminated.

Where the polysiloxane comprises a vinyl-terminated dialkylsiloxane homopolymer and a copolymer of a vinylalkylsiloxane and a dialkylsiloxane, the weight ratio of vinyl-terminated dialkylsiloxane homopolymer and copolymer of a vinylalkylsiloxane and a dialkylsiloxane may be 1:1 to 10:1, for example, 2:1 to 6:1 or 3:1 to 4:1. Accordingly, the silicone polymer may comprise (i) moieties derived from a vinyl-terminated dialkylsiloxane homopolymer and (ii) moieties derived from a copolymer of a vinylalkylsiloxane and a dialkylsiloxane, wherein the weight ratio of (i) to (ii) in the silicone polymer may be 1:1 to 10:1, for example, 2:1 to 6:1 or 3:1 to 4:1.

The silicone polymer matrix of the release layer may be capable of absorbing at least some of the liquid carrier of the electrophotographic ink composition. This may facilitate the release of the charged toner particles onto the print substrate. In some examples, the absorption or swelling capability of the silicone polymer matrix may remain substantially unaffected by the incorporation of fluoropolymer particles into the silicone polymer matrix.

Crosslinker

In some examples, the polysiloxane having crosslinkable moieties may be crosslinked using a crosslinker. The crosslinker may be employed to crosslink the polysiloxanes having crosslinkable moieties (e.g. the terminal or side alkenyl groups described in the present disclosure).

In some examples, the cross-linker may be an addition cure cross-linker component, for example a cross-linker comprising a silicon hydride (Si—H) moiety. In some examples, the cross-linker comprising a silicon hydride moiety may comprise a polysiloxane having a silicon hydride moiety. The silicon hydride moiety may be at an end siloxyl unit or an intermediate siloxyl unit in the polysiloxane of the second component. In some examples, all other substituents attached to the silicon atoms of the polysiloxane having a silicon hydride (Si—H) moiety are unsubstituted alkyl or unsubstituted aryl groups. In some examples, the cross-linker comprising a silicon hydride moiety is selected from a polysiloxane of the poly(dimethylsiloxy)-(siloxymethylhydro)-α,ω-(dimethylhydrosiloxy) type and α,ω-(dimethylhydrosiloxy) poly-dimethylsiloxane.

An example of a suitable crosslinking agent is Crosslinker 210® by Evonik®.

In some examples, the polysiloxane having a silicon hydride (Si—H) moiety has a dynamic viscosity of at least 100 mPa·s, in some examples at least 500 mPa·s. In some examples, the polysiloxane having a silicon hydride (Si—H) moiety has a dynamic viscosity of from 100 mPa·s to 2,000 mPa·s, in some examples a dynamic viscosity of from 300 mPa·s to 1,500 mPa·s, in some examples a dynamic viscosity of from 500 mPa·s to 1,300 mPa·s, in some examples a dynamic viscosity of from 700 mPa·s to 1,100 mPa·s, in some examples a dynamic viscosity of from 800 mPa·s to 1,000 mPa·s, in some examples a dynamic viscosity of around 900 mPa·s.

Crosslinking Catalyst

In some examples, the polysiloxane having crosslinkable moieties may be crosslinked in the presence of a crosslinking catalyst. The crosslinking catalyst may be an addition cure crosslinking catalyst, a condensation cure cross-linking catalyst, or an activated cure crosslinking catalyst.

Suitable catalysts may be metal An example suitable catalyst is Karstedt's solution (platinum (0)-1,3-divinyl-1,1,3,3-tetramethyldisiloxane complex solution).

Conductive Agent

The release layer may further comprise a conductive agent, for example an electrically conductive agent. The conductive agent may be dispersed in the silicone polymer matrix. The conductive agent may be present in the release layer in an amount of 0 to 5 wt % based on the total weight of the silicone polymer. In some examples, the conductive agent may be present in an amount of 0.1 to 3 wt %, for instance, 0.3 to 2 wt % or 0.5 to 1.5 wt % based on the total weight of the silicone polymer.

Any suitable conductive agent may be employed. An example is carbon black.

In some examples, the release layer comprises carbon black in an amount of about 0 to 5 wt % based on the total weight of the silicone polymer. In some examples, the conductive agent may be present in an amount of 0.1 to 3 wt %, for instance, 0.3 to 2 wt % or 0.5 to 1.5 wt % based on the total weight of the silicone polymer.

In some examples, the carbon black has a BET surface area of 600 m$^2$/g or greater, in some examples 800 m$^2$/g or greater, in some examples 1,000 m$^2$/g or greater, in some examples 1,200 m$^2$/g or greater, in some examples 1,300 m$^2$/g or greater, in some examples 1400 m$^2$/g or greater. The BET surface area of the carbon black may be determined according to ASTM Standard D6556-14.

In some examples, the carbon black comprises particles of which at least some have a primary particle diameter of about 50 nm or less, in some examples about 45 nm or less, in some examples about 42 nm or less, in some examples about 40 nm or less, in some examples about 38 nm or less, in some examples about 36 nm or less, in some examples about 35 nm or less, in some examples about 34 nm or less. In some examples, the carbon black comprises particles of which at least some have a primary particle diameter in the range of about 20 nm to about 50 nm. The primary particle diameter of carbon black particles may be determined using transmission electron microscopy.

In some examples, the mean primary particle diameter of the carbon black is about 50 nm or less, in some examples about 45 nm or less, in some examples about 42 nm or less, in some examples about 40 nm or less, in some examples about 38 nm or less, in some examples about 36 nm or less, in some examples about 35 nm or less, in some examples about 34 nm or less. The mean particle diameter of carbon black may be determined according to ASTM standard D3849.

In some examples, the carbon black has about $10 \times 10^{15}$ primary particles per gram or more, in some examples about $15 \times 10^{15}$ primary particles per gram or more, in some examples about $20 \times 10^{15}$ primary particles per gram or more, in some examples about $30 \times 10^{15}$ primary particles per gram or more, in some examples about $40 \times 10^{15}$ primary particles per gram or more, in some examples about $50 \times 10^{15}$ primary particles per gram or more, in some examples about $70 \times 10^{15}$ primary particles per gram or more, in some examples about $90 \times 10^{15}$ primary particles per gram or more, in some examples about $100 \times 10^{15}$ primary particles per gram or more, in some examples about $110 \times 10^{15}$ primary particles per gram or more.

In some examples, the carbon black may have a dibutyl phthalate absorption number (DBPA) of at least 200 ml/100 g, in some examples a DBPA number of at least 250 ml/100 g, in some examples a DBPA number of at least 300 ml/100 g, in some examples a DBPA number of at least 350 ml/100 g, in some examples a DBPA number of at least 400 ml/100 g, in some examples a DBPA number of at least 450 ml/100 g, in some examples a DBPA number of at least 475 ml/100 g. Dibutyl phthalate absorption number (DBPA) may be measured, for example, using a standard test, such as ASTM D2414-13a.

Pre-Cure Release Layer Composition

As described above, the present disclosure also relates to a method of making an intermediate transfer member. The method comprises applying a pre-cure release composition comprising at least one polysiloxane having crosslinkable moieties and fluoropolymer particles onto a flexible substrate, and curing the pre-cure release composition on the flexible substrate.

The pre-cure release layer composition may be prepared by dispersing fluoropolymer particles in a polysiloxane having crosslinkable moieties. Suitable fluoropolymer particles and polysiloxanes having crosslinkable moieties are described above. Carbon black or other conductive agent may also be dispersed in the polysiloxane. Crosslinkers and crosslinking catalysts may also be dispersed in the polysiloxane. Suitable crosslinkers and crosslinking catalysts are described above.

In one example, a first composition may be made by dispersing the fluoropolymer particles in polysiloxane(s) having crosslinkable moieties. Where employed, carbon black or other conductive agent may also be dispersed in the first composition. Thereafter, a crosslinker and crosslinking catalyst may be added to the first composition.

The pre-cure release composition may be produced by high shear mixing. The composition may be subjected to a shear rate of about 3,000 rpm or greater, for example about 4,000 rpm or greater, about 5,000 rpm or greater or about 6,000 rpm. In some examples the shear rate is applied for at least 3 minutes, in some examples at least 5 minutes, in some examples at least 6 minutes.

In some examples, the pre-cure release composition a dynamic viscosity of greater than about 100,000 mPa·s, for example greater than about 200,000 mPa·s, greater than about 300,000 mPa·s, greater than about 400,000 mPa·s, greater than about 500,000 mPa·s, greater than about 600,000 mPa·s, or greater than about 700,000 mPa·s.

In some examples, the pre-cure release composition may have a dynamic viscosity of up to about 800,000 mPa·s. In some examples, the dispersion comprising silicone oil containing carbon black and a trisiloxane surfactant dispersed therein has a dynamic viscosity in the range of about 400,000 mPa·s to about 800,000 mPa·s.

In some examples, the method of forming a pre-cure release layer composition comprises adding a volatile solvent to the pre-cure release layer composition. The method may comprise adding a volatile solvent to the pre-cure release layer composition to reduce the viscosity of the pre-cure release layer, for example to reduce the dynamic viscosity of the pre-cure release layer to less than about 50,000 mPa·s, or less than about 10,000 mPa·s In some examples, the method comprises adding a volatiles solvent to the pre-cure release layer composition comprises a volatile solvent in such an amount to reduce the dynamic viscosity of the pre-cure release layer to a dynamic viscosity in the range of about 200 to about 50,000 mPa·s, for example about 500 to about 50,000 mPa·s, or about 1,000 to about 10,000 mPa·s.

Release Layer

As described above, the release layer may be formed by applying the pre-cure release composition onto a flexible substrate and then curing the pre-cure release composition on the substrate.

The pre-cure release composition may be applied to the flexible substrate by any suitable method. For example, the composition may be applied by rod coating or gravure coating.

Where the pre-cure release layer comprises a volatile solvent, the pre-cure release composition, may be applied to the flexible substrate and heated to remove the volatile solvent, for example before the pre-cure release layer composition is cured. Removal of the volatile solvent from the pre-cure release layer may comprise heating the pre-cure release layer, for example to a temperature of greater than about 50° C., for example greater than about 55° C., or 60° C. or greater. In some examples, the pre-cure release layer may be heated to a temperature in the range of about 50-100° C., for example, 55-90° C., or 60-85° C. to remove volatile solvent from the pre-cure release layer composition. In some examples, removal of volatile solvent from the pre-cure release layer composition may comprise heating of the pre-cure release layer composition for about 1 min or more, for example about 2 mins or more, or about 3 mins or more. Heating may be carried out at standard pressure.

In some examples, curing of the pre-cure release layer composition may comprise heating the pre-cure release layer composition. In some examples, the pre-cure release layer composition may be cured by heating the pre-cure release layer composition to a temperature of about 100° C. or greater, for example about 120° C. or greater. In some examples, the pre-cure release layer composition may be cured by heating the pre-cure release layer composition to a temperature in the range of about 80° C. to about 200° C., for example about 100° C. to about 150° C., or about 120° C. In some examples, the pre-cure layer composition may be cured by heating for at least about 20 mins, for example at least about 30 mins, or about 1 hour or more. In some examples, curing involves heating the pre-cure release layer composition for a time in the range of about 20 mins to about 5 hours, for example about 30 mins to about 2 hours.

The release layer may be 2 to 10 microns thick, for example, 3 to 8 microns thick. In some examples, the release layer may be 4 to 7 microns thick, for example, 5 to 6 microns thick.

Intermediate Transfer Member (ITM)

As described above, an intermediate transfer member (ITM) transfers ink printed on a photoconductive surface to a print substrate. The ITM may also be referred to as a printing blanket. The ITM may comprise a supporting substrate (e.g. flexible substrate) and a release layer (e.g. outer release layer) disposed on the supporting substrate. The ITM may be installed over a drum or cylinder in the printing press, for example, with the release layer as the external or outward facing surface.

The supporting substrate of the ITM may comprise two or more layers. For example, the supporting substrate may comprise a base layer, and at least one of a compressible layer and a soft layer. In some examples, the supporting substrate may comprise a base layer, a compressible layer and a soft layer. In some examples, the supporting substrate may comprise a base layer, a compressible layer, an electrically conductive layer and a soft layer.

The base layer may be a fabric layer. When installed over the drum, the base layer may be in contact with the drum's surface.

A compressible layer may be disposed over the base layer. The compressible layer may help to compensate for machine tolerances and print substrate thickness variations. The compressible layer may help the ITM to conform to the surface of rough print substrates.

An electrically conductive layer may be applied over the compressible layer. The electrically conductive layer may help to distribute the applied voltage to facilitate ink transfer from the photoconductive surface to the ITM.

A soft layer may be applied over the electrically conductive layer. The soft layer may help to provide a smooth surface for receiving the release layer.

A release layer may be applied over the soft layer. As described above, the release layer facilitates transfer of the ink from the ITM to the print substrate. A primer layer may be applied to the soft layer before the release layer is applied.

In some examples, the ITM (or printing blanket) comprises a fabric layer, a compressible layer disposed over the fabric layer, a conductive layer disposed over the compressible layer, a soft compliance layer disposed over the conductive layer, a primer layer disposed over the soft compliance layer and the release layer disposed over the primer.

Figure 1:
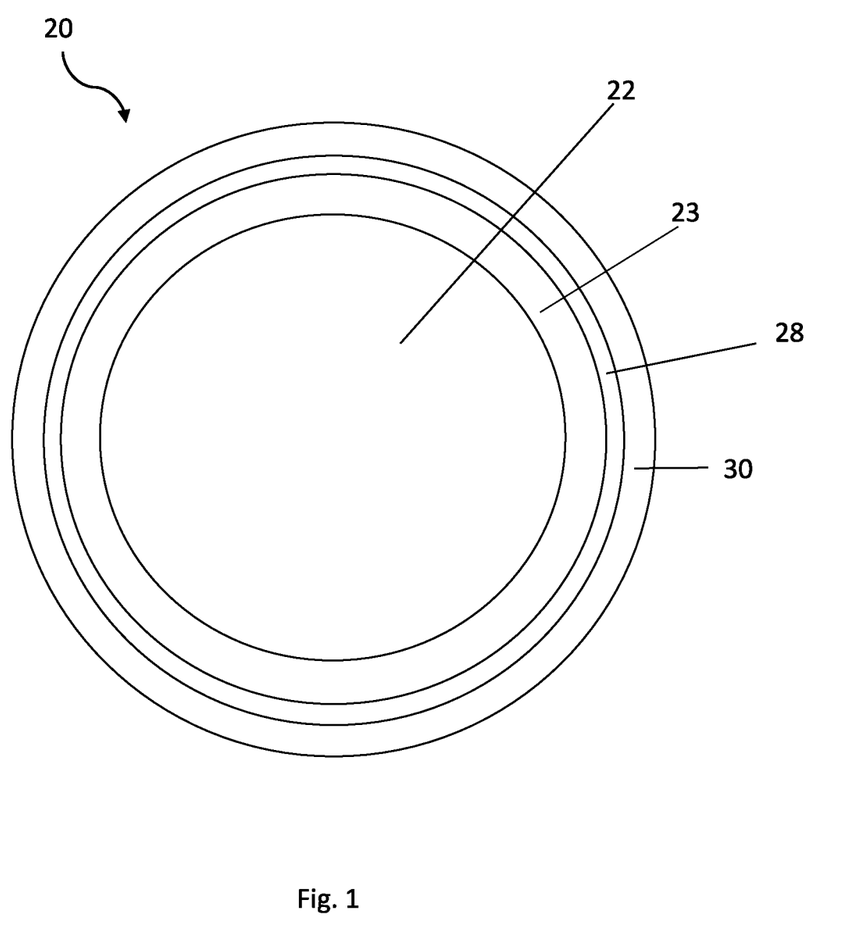
FIG. 1 is a schematic cross-sectional view of an example of an intermediate transfer member (ITM) mounted on a drum.

FIG. 1 is a cross-sectional diagram of an example of an ITM. The ITM 20 may be installed over a drum 22 in the form of a metal cylinder. The ITM 20 may comprise a supporting substrate 23 and an outer release layer 30. The ITM 20 may also comprise a primer layer 28 disposed between the substrate layer 23, and an outer release layer 30.

Figure 2:
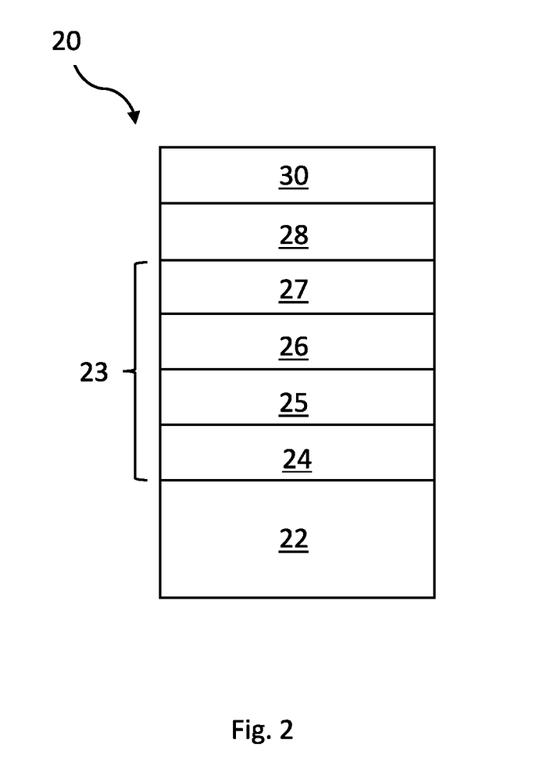
FIG. 2 is a schematic cross-sectional view of an example of an ITM.

FIG. 2 shows a schematic cross-sectional view of an example of an ITM 20 installed over a drum 22. In this example, the ITM may have a supporting substrate 23 comprising four layers. The supporting substrate 23 may comprise a fabric layer 24, a compressible layer 25, a conductive layer 26 and a compliance layer 27.

The fabric layer 24 may be a fabric layer formed from a woven or non-woven material. Examples of suitable materials include cotton, synthetic, combined natural and synthetic materials. The material may be treated, for example, to have improved heat resistance. In an example the fabric layer 24 is a fabric layer formed of NOMEX material having a thickness, for example, of about 200 μm.

The compressible layer 25 may be a rubber layer. The rubber may comprise an acrylic rubber (ACM), a nitrile rubber (NBR), a hydrogenated nitrile rubber (HNBR), a polyurethane elastomer (PU), an EPDM rubber (an ethylene propylene diene terpolymer), or a fluorosilicone rubber (FLS).

The compliance layer 27 may comprise a soft elastomeric material having a Shore A hardness of less than about 65, or a Shore A hardness of less than about 55 and greater than about 35, or a Shore A hardness value of between about 42 and about 45. In some examples, the compliance layer 27 comprises a polyurethane or acrylic. Shore A hardness may be determined by ASTM standard D2240.

In some examples, the compliance layer may comprise rubber. Examples of suitable rubber materials include an acrylic rubber (ACM), a nitrile rubber (NBR), a hydrogenated nitrile rubber (HNBR), a polyurethane elastomer (PU), an EPDM rubber (an ethylene propylene diene terpolymer), a fluorosilicone rubber (FMQ), a fluorocarbon rubber (FKM or FPM) or a perfluorocarbon rubber (FFKM)

In an example the compressible layer 25 and the compliance layer 27 are formed from the same material.

The conductive layer 26 may comprise a rubber and a conductive material. Examples of suitable rubber materials include acrylic rubber (ACM), nitrile rubber (NBR), hydrogenated nitrile rubber (HNBR), or EPDM rubber (an ethylene propylene diene terpolymer). In some examples, the conductive layer 26 may be omitted, such as in some examples in which the compressible layer 25, the compliance layer 27, or the release layer 30 are partially conducting. For example, the compressible layer 25 and/or the compliance layer 27 may be made to be partially conducting with the addition of conductive carbon black or metal fibres.

A primer layer 28 may be provided to facilitate bonding or joining of the release layer 30 to the substrate layer 23. The primer layer 28 may comprise an organosilane, for example, an organosilane derived from an epoxysilane. Examples of suitable silanes include 3-glycidoxypropyl trimethylsilane, a vinyl silane (e.g. vinyl trimethoxysilane, vinyltriethoxysilane), an allyl silane, or an unsaturated silane. The primer may be cured in the presence of a catalyst, for example, a catalyst comprising titanium and/or platinum.

In an example, a curable primer layer is applied to a compliance layer 27 of a substrate layer 23, for example to the outer surface of a compliance layer 27. The curable primer layer may be applied using a rod coating process. The curable primer may comprise a first primer comprising an organosilane and a first catalyst comprising titanium, for example, an organic titanate or a titanium chelate. In an example the organosilane is an epoxysilane, for example 3-glycidoxypropyl trimethoxysilane (available from ABCR GmbH & Co. KG, Im Schlehert 10 D-76187, Karlsruhe, Germany, product code SIG5840) and vinyltriethoxysilane (VTEO, available from Evonik, Kirschenallee, Darmstadt, 64293, Germany), vinyltriethoxysilane, an allyl silane or an unsaturated silane. The first primer is curable by, for example, a condensation reaction. For example, the first catalyst for a silane condensation reaction may be an organic titanate such as Tyzor® AA75 (available from Dorf-Ketal Chemicals India Private Limited Dorf Ketal Tower, D'Monte Street, Orlem, Malad (W), Mumbai-400064, Maharashtra INDIA). The primer may also comprise a second primer comprising an organosilane, e.g. a vinyl siloxane, such as a vinyl silane, for example vinyl triethoxy silane, vinyltriethoxysilane, an allyl silane or an unsaturated silane, and, in some examples, a second catalyst. The second primer may also be curable by a condensation reaction. In some examples, the second catalyst, if present, may be different from the first catalyst and in some examples comprises platinum or rhodium. For example, the second catalyst may be a Karstedt catalyst with, for example, 9% platinum in solution (available from Johnson Matthey, 5th Floor, 25 Farringdon Street, London EC4A 4AB, United Kingdom) or a SIP6831.2 catalyst (available from Gelest, 11 East Steel Road, Morrisville, Pa. 19067, USA).

In some examples, the second catalyst is a catalyst for catalysing an addition cure reaction. In such cases the second catalyst may catalyse an addition cure reaction of the pre-cure release composition to form the release layer 30 when the pre-cure release composition comprises at least one silicone oil having alkene groups linked to the silicone chain of the silicone oil, for example a vinyl functional siloxane and a cross-linker comprising a silicone hydride component.

The curable primer layer applied to the substrate layer 23 may comprise a first primer and/or a second primer. The curable primer layer may be applied to the substrate layer 23 as two separate layers, one layer containing the first primer and the other layer containing the second primer.

The rubbers of the compressible layer 25, the conductive layer 26 and/or the compliance layer 27 of the substrate layer 23 may be uncured when the curable primer layer is applied thereon.

The outer release layer 30 of the ITM 20 comprises fluoropolymer particles dispersed in a silicone polymer matrix.

The outer release layer 30 may be formed on the ITM by applying a pre-cure release layer composition to the supporting substrate 23 of the ITM. For example, the outer release layer may be applied to the supporting substrate 23 or on top of a curable primer layer which has already been applied to the supporting substrate layer 23.

Once cured, the ITM comprises an outer release layer 30 disposed on a substrate layer 23, or, if present, disposed on a primer layer 28.

Electrophotographic Printer

Also described in the present disclosure is an electrophotographic printer, e.g. a liquid electrophotographic (LEP) printer. The printer may comprise an intermediate transfer member (ITM) comprising a release layer comprising fluoropolymer particles dispersed in a silicone polymer matrix. The printer may also comprise a photoconductive member having a surface on which a latent electrostatic image can be created. On contacting the surface of the photoconductive member with an electrostatic ink composition, an image may be developed on the surface of the latent electrostatic image. The developed image may then be transferred to the release layer of intermediate transfer member. The developed image may then be transferred from the release layer of the intermediate transfer member to a print substrate.

Figure 3:
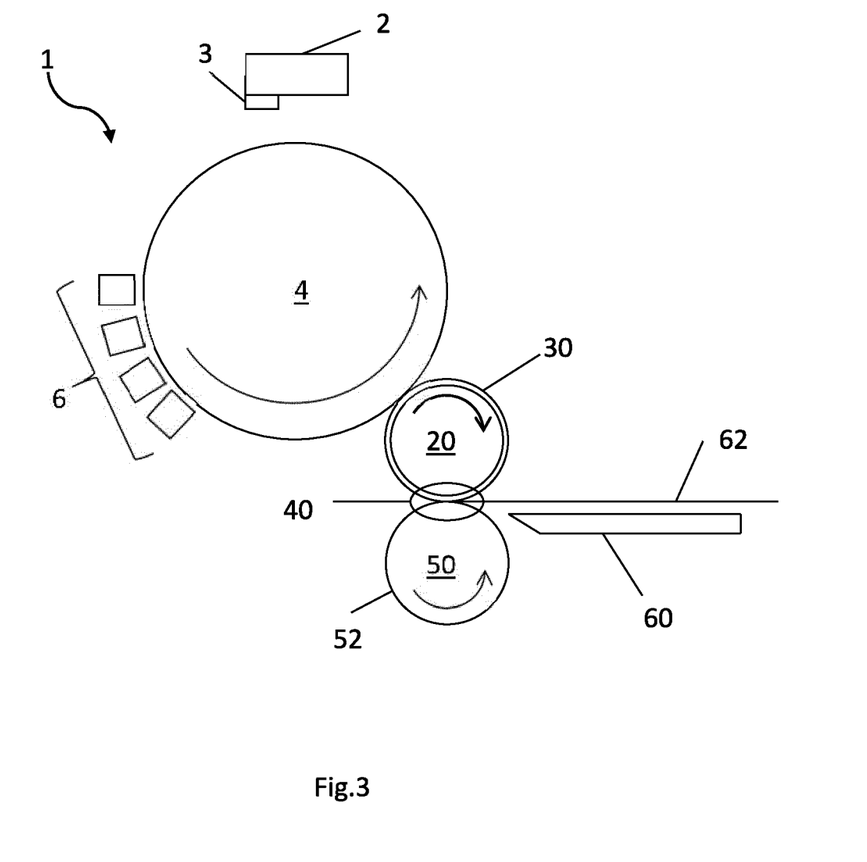
FIG. 3 is a schematic view of an example of a Liquid Electro Photographic (LEP) printer.

FIG. 3 shows a schematic illustration of an example of a liquid electrophotographic printer (LEP) 1. The LEP may comprise a photo charging unit 2 and a photoconductive member in the form, for example, of a photo-imaging cylinder 4. The image may be initially formed on the form of a photo-imaging cylinder 4 before being transferred (first transfer) to the outer release layer 30 of an ITM 20 (installed over a drum or roller). The image may then be transferred from the outer release layer 30 of the ITM 20 to a print substrate 62 (second transfer).

The initial image may be formed on the rotating photo-imaging cylinder 4 by the photo charging unit 2. The photo charging unit 2 may deposit a uniform static charge on the photo-imaging cylinder 4. Thereafter, a laser imaging portion 3 of the photo charging unit 2 may dissipate static charges in selected portions of the image area on the photo-imaging cylinder 4 to leave a latent electrostatic image. The latent electrostatic image may be an electrostatic charge pattern representing the image to be printed. Ink may then be transferred to the photo-imaging cylinder 4 by Binary Ink Developer (BID) units 6. The BID units 6 may present a uniform film of ink to the photo-imaging cylinder 4. The ink contains electrically charged pigment particles which, by virtue of an appropriate potential on the electrostatic image areas, are attracted to the latent electrostatic image on the photo-imaging cylinder 4. The ink does not adhere the uncharged, non-image areas and forms a developed image on the surface of the latent electrostatic image. The photo-imaging cylinder 4 then has a single colour ink image on its surface.

The developed image is then transferred from the photo-imaging cylinder 4 to the outer release layer 30 of the ITM 20 by electrical forces. The image may be transferred (first transfer) from the photo-imaging cylinder 4 to the ITM 20 by virtue of an appropriate potential applied between the photo-imaging cylinder 4 and the ITM 20, such that the charged ink is attracted to the ITM 20.

The transferred image is then dried and fused on the outer release layer 30 of the ITM 20 before being transferred (second transfer) from the outer release layer 30 of the ITM 20 to a print substrate wrapped around an impression cylinder 50. The print substrate 62 may be fed into the printing apparatus by the print substrate feed tray 60 and is wrapped around the impression cylinder 50. As the print substrate 62 contacts the ITM 20, the developed image is transferred from the ITM 20 to the print substrate 62.

The process may be repeated for each of the coloured ink layers to be included in the final image.

Between the first and second transfers the solid content of the developed image may increase and the ink may be fused on to the ITM 20. For example, the solid content of the developed image deposited on the outer release layer 30 after the first transfer may be around 20%, but by the second transfer the solid content of the developed image is may be around 80-90%. This drying and fusing may be achieved by using elevated temperatures and air flow assisted drying. In some examples, the ITM 20 may be heated.

EXAMPLES

Reference Example 1

A pre-cure precursor composition was prepared by providing 1,000 g of silicone oil (800 grams of Dimethylsiloxane vinyl terminated (vs500® supplied by Abcr® GmbH), and 200 grams of Vinylmethylsiloxane-Dimethylsiloxane Copolymer vinyl terminated (xprv5000® supplied by Abcr® GmbH). 10 g of conductive carbon black (Ketjenblack EC600JD) (1 wt. % by weight of silicone oil) was added to the silicone oil.

Example 1

A pre-cure precursor composition was prepared by providing 1,000 g of silicone oil (800 grams of Dimethylsiloxane vinyl terminated (vs500® supplied by Abcr® GmbH), and 200 grams of Vinylmethylsiloxane-Dimethylsiloxane Copolymer vinyl terminated (xprv5000® supplied by Abcr® GmbH). 10 g of conductive carbon black (Ketjenblack EC600JD) (1 wt. % by weight of silicone oil) and 10 g of PTFE powder (Fluon FL1700, AGC Chemicals (1 wt. % by weight of silicone oil) was added to the silicone oil.

Example 2

A pre-cure precursor composition was prepared by providing 1,000 g of silicone oil (800 grams of Dimethylsiloxane vinyl terminated (vs500® supplied by Abcr® GmbH), and 200 grams of Vinylmethylsiloxane-Dimethylsiloxane Copolymer vinyl terminated (xprv5000® supplied by Abcr® GmbH). 10 g of conductive carbon black (Ketjenblack EC600JD) (1 wt. % by weight of silicone oil) and 20 g of Fluon FL1700 (2 wt. % by weight of silicone oil) were added to the silicone oil.

Each of the pre-cure precursor compositions of Reference Example 1 and Examples 1-2 were processed by high shear mixer for 6 minutes at shear rate of 6,000 rpm.

Example 3

100 g Hydride siloxane Crosslinker 210, 50 g Inhibitor 600 and 5 gr Karstedt solution 0.5% Pt were then added to the pre-cure precursor composition of Reference Example 1 (formulation as set out in table 1 below) and mixed for 2 min at 6,000 rpm. The properties of the resulting pre-cure release composition is shown in Table 1 below.

TABLE 1

| Example 3 pre-cure release composition | | | | |
|---|---|---|---|---|
| Materials | Mass (g) | Dynamic Viscosity (mPa · s) | Functional group content | Supplier |
| Dimethylsiloxane vinyl terminated (vs500) | 800 | 500 | 0.14 Vinyl (mmole/g) | ABCR ® |
| Vinylmethylsiloxane - Dimethylsiloxane Copolymer vinyl terminated (xprv5000) | 200 | 3000 | 0.4 Vinyl (mmole/g) | |
| Hydride siloxane Crosslinker 210 | 100 | 900 | 4.2 SiH (mmole/g) | ABCR ® |
| Inhibitor 600 | 50 | 900 | 0.11 Vinyl (mmole/g) | Evonik ® |
| Karstedt solution 0.5% Pt | 5 | 500 | 0.14 Vinyl (mmole/g) | Johnson Matthey ® Chemical Products |
| Conductive Carbon black Ketjenblack EC600JD | 10 | | | Akzo Nobel ® |

Example 4

Pre-cure release compositions were formed in the same way as Example 3 when 100 g Hydride siloxane Crosslinker 210, 50 g Inhibitor 600 and 5 gr Karstedt solution 0.5% Pt were then added to the processed pre-cure precursor composition of Example 1 and mixed for 2 min at 6,000 rpm.

Example 5

Pre-cure release compositions were formed in the same way as Example 3 when 100 g Hydride siloxane Crosslinker 210, 50 g Inhibitor 600 and 5 gr Karstedt solution 0.5% Pt were then added to the processed pre-cure precursor composition of Example 2 and mixed for 2 min at 6,000 rpm.

Example 6

Bulk Layer Formation for Swelling Capacity Test

The pre-cure release compositions of Examples 3, 4 and 5 were was placed in an oven at 120° C. for 1.5 hours to obtain dry films.

The "bulk swelling capacity" was determined according to the following test. A dry film have a thickness of between 1 to 3 mm was initially weighed to determine a dry weight of the film. The dry film was then immersed in solvent (Isopar® L) in a sealed container. After 20 hours at 100 degrees C., the film was cooled and removed from the solvent with excess solvent blotted with a clean dry cloth. The swollen film (swollen with solvent) was weighed to determine its swollen weight. The bulk swelling capacity (%) is defined by the following formula: (swollen weight-dry weight)*100%/dry weight.

Bulk swelling capacity as a result of Fluon FL 1700 incorporation was tested (1 wt. % by weight of silicone oil, Example 4 and 2 wt. % by weight of silicone oil, Example 5) and compared to the standard formulation without PTFE (Example 3). No significant change in bulk swelling of the silicone formulation was recorded, detecting 112±3% without PTFE (composition of Example 3), 111%±3% at 1 wt. % Fluon FL1700 (composition of Example 4), and 108±3% at 2 wt. % Fluon FL1700 (composition of Example 4).

Example 7

Release Layer Formation from a Pre-Cure Release Layer Composition

The pre-cure release composition of Example 3 was gravure coated onto an ITM supporting substrate to form ITM having the following structure from bottom (layer 1) to top (layer 6):
1. Fabric layer.
2. Rubber based compressible layer (NBR from ContiTech AG Vahrenwalder Str. 9 30165 Hannover Germany).
3. Rubber based conductive layer (NBR from ContiTech)
4. Rubber based soft compliance layer (ACM from ContiTech)
5. Primer layer (gravure coated on substrate (rubber layer no 4) and formed layer by layer). Primer formulation is described in table 2 below.
6. Pre-cure release layer composition as described in Table 1 above.

The primer layer was formed by gravure coating the soft compliance layer (layer 4) of the ITM with a primer having the composition shown in Table 2 below.

TABLE 2

| Primer composition. | | |
| --- | --- | --- |
| Materials of primer | Wt. % in formulation | Supplier |
| 3Glycidoxypropyl)trimethoxysilane | 52 | ABCR ® |
| Vinyltrimethoxysilane | 35 | ABCR ® |
| Tyzor AA75 | 10 | Dorf Ketal ® |
| Karstedt solution 9% Pt | 3 | Johnson Matthey ® |

A pre-cure release layer composition having the composition shown in Table 1 (as described above) was then provided on the primer layer using a gravure coating process.

After the coating process was complete, the whole ITM was placed in an oven at 120° C. for 1.5 hours to cure.

Example 8

The procedure of Example 7 was repeated, except that the pre-cure release composition of Example 4 was used to form the release layer.

Example 9

Stress tests were performed to create a situation where ink was incompletely transferred to the substrate, so called "ink left on blanket test". For each of the ITMs of Example 7 and 8, 100 copies of an image comprising 12 bands with different ink colour and coverage were printed using the HP Indigo 7500 digital press. Printing was carried out at a temperature of 100° C. (below the standard print process temperature of 110° C.). The lower temperature was selected to induce partial ink transfer from the ITM to the paper and gradual accumulation of ink of the ITM's release surface. The printing press was then stopped suddenly to prevent complete ink transfer to the print substrate.

The temperature of the ITM unit was then raised to 125° C. and maintained for 15 minutes to allow the carrier liquid to evaporate completely. This caused the fused ink to adhere strongly to the ITM surface.

Afterwards, sheets of A4 were printed with yellow ink at 100% coverage as a "cleaner" to remove residual ink left on the ITM. The number of cleaners printed before a clean image (A4 100% yellow image) could be obtained was determined. The lower the number of cleaners printed, the better the cleaning ability of the ITM surface. This was indicative of a blanket with improved release properties, demonstrating a decreased stickiness of the blanket.

5 ITMs produced according to Example 8 were compared to 5 standard ITMs according to Example 7. PTFE incorporation was observed to induce a significant decrease in the number of "cleaners" needed to clean the ITM surface completely from the fused ink. In the case of the ITMs produced using the composition of Example 7, 44.2±5.3 cleaners were required, while only 25±4.8 cleaners were sufficient in the case of ITMs produced using the composition of Example 8.

Example 10

The stress test used in Example 9 was modified to create a "paper stuck on blanket" (PSTB) failure. With a PSTB failure, ink remains so strongly adhered to the ITM surface that the print substrate sticks to the blanket or ITM. To induce this effect, 200 copies of an image comprising 12 bands with different ink colour and coverage were printed using the HP Indigo 7500 digital press for each of the ITMs of Examples 7 and 8.

Printing was carried out at a temperature of 100° C. (below the standard print process temperature of 110° C.). The lower temperature was selected to induce partial ink transfer from the ITM to the paper and gradual accumulation of ink of the ITM's release surface. The printing press was also forced to stop suddenly to prevent complete ink transfer to the print substrate.

The temperature of the ITM unit was then raised to 125° C. and maintained for 30 minutes to allow the carrier liquid to evaporate completely and induce very strong adhesion between the fused ink and ITM surface.

Afterwards, "cleaners" were printed in order to remove residual ink as described in Example 9. In some cases, PSTB failure was observed, where the print substrate used as cleaner permanently adhered to the ITM.

The results of this test revealed that 5 ITMs of Example 7 experienced PSTB failure at the very first "cleaner" page printed, demonstrating immediate paper adhesion to the fused ink accumulated on the blanket surface. It should be emphasized that the recorded PSTB failures were lethal to the blankets. Damage to the blankets was permanent and the blankets had to be replaced. In contrast, 5 ITMS of Example 8 did not experience any PSTB failure, and there was no paper adhesion to the blanket surface. The blanket surface could be cleaned by printing the "cleaner" pages. The presence of PTFE in the release layer allowed the ITM surface to be cleaned. This suggests that PTFE improved the release properties of the blanket, reducing the risk of PSTB failure.

Example 11

In this example, the contact angle of ITMs having different amounts of PTFE in their release layers were determined.

Figure 4:
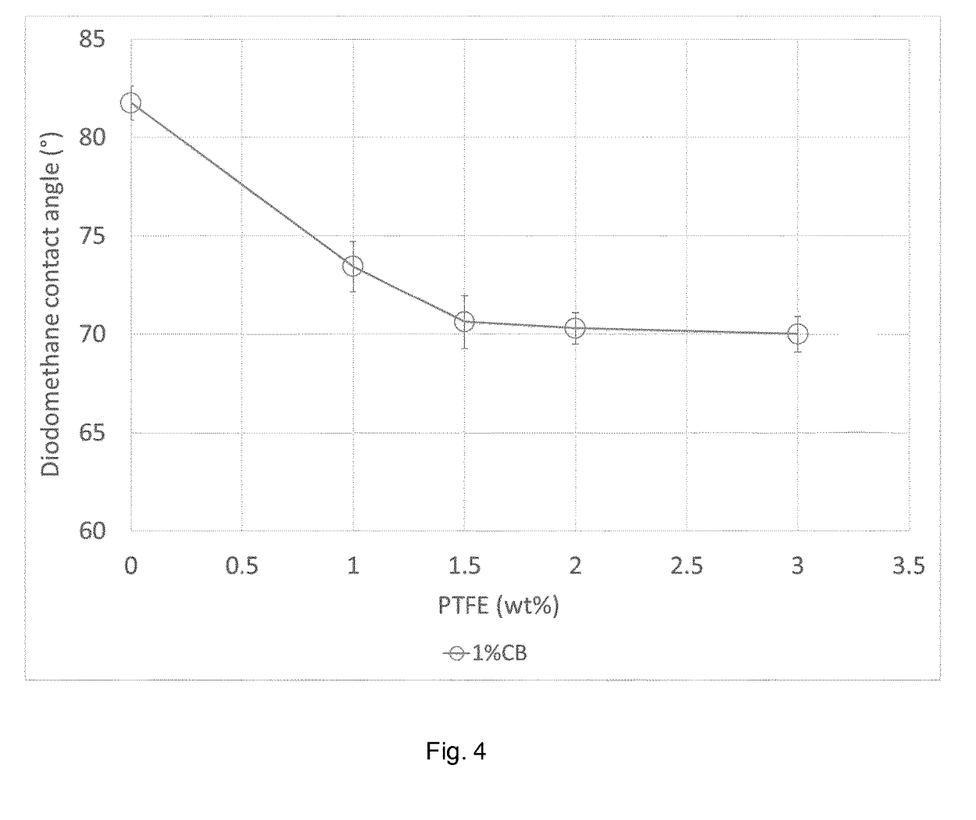
FIG. 4 is a graph showing how diiodomethane contact angle varies with PTFE content.

An ITM comprising a release layer was produced using a method described in Example 7. The release properties of the ITM release layer were determined by contact angle of diiodomethane (oil) measurements on the surface of the blanket. As shown in FIG. 4, a decrease in diiodomethane contact angle was recoded from 82° to 70°, as increasing amounts of PTFE particles were incorporated into the silicone polymer matrix of the release layer. Further PTFE incorporation (up to 10 wt %) did not result in any additional decrease of diiodomethane contact angle, suggesting that the silicone polymer surface is almost saturated with PTFE particles at the range of 1-2 wt %.

The decrease in oil contact angle observed with PTFE incorporation suggests that the silicone release layers become more hydrophobic as a result of PTFE incorporation. This suggests that PTFE incorporation would facilitate removal of the ink from the blanket Example 12

In this Example, the procedure of Example 7 was repeated, except that the pre-cure release composition of Example 5 was used to form the release layer. The dynamic friction coefficient of the release layer was determined against a coated paper sheet according to ASTM D1894 using an Instron® model 2810-005 coefficient of friction fixture. The coefficient of friction was determined to be 0.9. This is identical to the coefficient of friction of release layers of ITMs produced according to Examples 7 and 8. Thus, the coefficient of friction was unaffected by the incorporation of PTFE in Examples 8 and 12 compared to Example 7.

Reference Example 13

In this Example, attempts were made to incorporate other powder-based lubricants (boron nitride and zinc stearate) into a silicone polymer matrix. It was difficult to disperse boron nitride in the silicone polymer and sedimentation was obtained. Zinc stearate could be dispersed but large aggregate particles were formed. The resulting composition was unsuitable for producing a release layer having an appropriate thickness.

The invention claimed is:

1. An intermediate transfer member for use in electrostatic printing, the intermediate transfer member comprising a release layer comprising fluoropolymer particles dispersed in a silicone polymer matrix.

2. An intermediate transfer member as claimed in claim 1, wherein the release layer comprises 0.25 to 3 wt % fluoropolymer particles based on the weight of silicone polymer.

3. An intermediate transfer member as claimed in claim 1, wherein the release layer comprises 0.75 to 2.5 wt % fluoropolymer particles based on the weight of silicone polymer.

4. An intermediate transfer member as claimed in claim 1, wherein the fluoropolymer particles are polytetrafluoroethylene.

5. An intermediate transfer member as claimed in claim 1, wherein the fluoropolymer particles have a particle size of less than 2 mm.

6. An intermediate transfer member as claimed in claim 1, wherein the fluoropolymer particles have a melting point of 300 to 400 degrees C.

7. An intermediate transfer member as claimed in claim 1, wherein the release layer further comprises an electrically conductive additive.

8. An intermediate transfer member as claimed in claim 7, wherein the electrically conductive additive is carbon black.

9. An intermediate transfer member as claimed in claim 8, wherein the release layer comprises carbon black in an amount of 0.5 to 5 wt % based on the weight of silicone polymer.

10. An intermediate transfer member as claimed in claim 1, wherein the release layer has a thickness of 3 to 10 microns.

11. An intermediate transfer member as claimed in claim 1, wherein the release layer is disposed on a primer layer comprising a silicone polymer.

12. An intermediate transfer member as claimed in claim 1, which comprises a fabric layer, a compressible layer disposed over the fabric layer, a conductive layer disposed over the compressible layer, a soft compliance layer disposed over the conductive layer, a primer layer disposed over the soft compliance layer and the release layer disposed over the primer.

13. A method of making the intermediate transfer member as claimed in claim 1, said method comprising
applying a pre-cure release composition comprising at least one polysiloxane having crosslinkable moieties, and fluoropolymer particles onto a supporting substrate, and
curing the pre-cure release composition on the supporting substrate to form the release layer.

14. A method as claimed in claim 13, wherein the pre-cure release composition comprises 0.25 to 3 wt % fluoropolymer particles based on the total weight polysiloxane polymer in the pre-cure release composition.

15. An electrophotographic printer comprising the intermediate transfer member as claimed in claim 1.

16. A method as claimed in claim 13, wherein the fluoropolymer particles are polytetrafluoroethylene.

17. A method as claimed in claim 13, wherein the fluoropolymer particles have a particle size of less than 2 mm.

18. A method as claimed in claim 13, wherein the fluoropolymer particles have a melting point of 300 to 400 degrees C.

19. A method as claimed in claim 13, wherein the release layer further comprises an electrically conductive additive.

20. A method as claimed in claim 13, wherein the release layer is disposed on a primer layer comprising a silicone polymer.

* * * * *